(12) United States Patent
Ikari et al.

(10) Patent No.: US 7,060,338 B2
(45) Date of Patent: Jun. 13, 2006

(54) PHASE-CHANGE OPTICAL RECORDING MEDIUM

(75) Inventors: Yoshihiro Ikari, Moriya (JP); Akira Kashiwakura, Moriya (JP); Makoto Miyamoto, Shimotsuma (JP); Makoto Iimura, Shimotsuma (JP); Naoki Kitagaki, Moriya (JP); Yutaka Watanabe, Mitsukaido (JP); Mayumi Kurokawa, Yuki-gun (JP); Sonoko Onodera, Yuki-gun (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 10/874,309

(22) Filed: Jun. 24, 2004

(65) Prior Publication Data

US 2004/0264357 A1    Dec. 30, 2004

(30) Foreign Application Priority Data

Jun. 26, 2003  (JP) ............................ 2003-182634
Oct. 23, 2003  (JP) ............................ 2003-363017

(51) Int. Cl.
   *B32B 3/02*   (2006.01)
(52) U.S. Cl. .................. 428/64.1; 428/64.4; 428/54.5; 430/270.13
(58) Field of Classification Search ............... 428/64.1, 428/64.4, 64.5, 64.6; 430/270.13
See application file for complete search history.

(56) References Cited

U.S. PATENT DOCUMENTS

| | | | | |
|---|---|---|---|---|
| 5,187,052 A | * | 2/1993 | Maeda et al. | 430/270.13 |
| 6,153,063 A | * | 11/2000 | Yamada et al. | 204/192.22 |
| 6,821,707 B1 | * | 11/2004 | Uno et al. | 430/270.13 |
| 6,823,528 B1 | * | 11/2004 | Yamasaki et al. | 720/719 |
| 6,841,217 B1 | * | 1/2005 | Nishihara et al. | 428/64.1 |
| 2004/0013069 A1 | * | 1/2004 | Uno et al. | 369/59.11 |

FOREIGN PATENT DOCUMENTS

| | | |
|---|---|---|
| JP | A-10-289478 | 10/1998 |
| JP | A-11-167746 | 6/1999 |
| JP | A-11-238249 | 8/1999 |
| JP | A-11-339316 | 12/1999 |
| JP | A-2001-126312 | 5/2001 |
| JP | A-2002-74739 | 3/2002 |
| JP | A-2002-74747 | 3/2002 |
| WO | WO97/34298 | 9/1997 |

* cited by examiner

*Primary Examiner*—Elizabeth Mulvaney
(74) *Attorney, Agent, or Firm*—Oliff & Berridge, PLC

(57) ABSTRACT

A phase-change optical recording medium capable of performing recording and reproduction at a high speed is provided, in which a reproduced signal output is not only sufficiently large but the phase-change optical recording medium also has excellent repeated rewriting performance. An interface layer 3, which is composed of a Ge—Si—N-based material, is formed on at least a surface of one side of a recording layer 4 of the phase-change optical recording medium 10. Accordingly, even when a phase-change material having a high melting point, for example, a Bi—Ge—Te-based phase-change material is used for the recording layer 4, it is possible to provide the phase-change optical recording medium in which the reproduced signal output is sufficiently large and the repeated rewriting performance is excellent.

20 Claims, 14 Drawing Sheets

FIG. 5

| RATIO (at.%) | Si | 0 | 20 | 40 | 60 | 80 |
|---|---|---|---|---|---|---|
| | Ge | 100 | 80 | 60 | 40 | 20 |
| SITUATION OF FILM EXFOLIATION | | + | + | + | ± | − |

FIG. 8

| COMPOSITION OF RECORDING LAYER | at.%Ge | Ge-N | Ge-Cr-N | Ge-Si-N |
|---|---|---|---|---|
| $Ge_2Sb_2Te_5$[RELATIVE RATIO] | 22.2 | + | + | + |
| $Ge_3Sb_2Te_6$[RELATIVE RATIO] | 27.3 | ± | + | + |
| $Ge_4Sb_2Te_7$[RELATIVE RATIO] | 30.8 | ± | ± | + |
| $Bi_4Ge_{30.8}Sb_{11.4}Te_{53.8}$[at.%] | 30.8 | ± | ± | + |
| $Ge_5Sb_2Te_8$[RELATIVE RATIO] | 33.3 | ± | ± | + |
| $Ge_6Sb_2Te_9$[RELATIVE RATIO] | 35.3 | − | ± | + |
| $Ge_7Sb_2Te_{10}$[RELATIVE RATIO] | 36.8 | − | ± | + |
| $Ge_8Sb_2Te_{11}$[RELATIVE RATIO] | 38.1 | − | ± | + |
| $Bi_7Ge_{41}Te_{52}$[at.%] | 41.0 | − | ± | + |
| $Bi_3Ge_{46}Te_{51}$[at.%] | 46.0 | − | − | + |
| $Bi_1Ge_{49}Te_{50}$[at.%] | 49.0 | − | − | + |

FIG. 9

| COMPOSITION OF RECORDING LAYER [at.%] | (Ge+Sn) at.% | Ge-N | Ge-Cr-N | Ge-Si-N |
|---|---|---|---|---|
| $Ge_{25.8}Sb_{15.4}Sn_5Te_{53.8}$ | 30.8 | ± | ± | + |
| $Ge_{20.8}Sb_{15.4}Sn_{10}Te_{53.8}$ | 30.8 | ± | ± | + |
| $Ge_{15.8}Sb_{15.4}Sn_{15}Te_{53.8}$ | 30.8 | ± | ± | + |
| $Ge_{28.3}Sb_{13.3}Sn_5Te_{53.4}$ | 33.3 | ± | ± | + |
| $Ge_{23.3}Sb_{13.3}Sn_{10}Te_{53.4}$ | 33.3 | ± | ± | + |
| $Ge_{18.3}Sb_{13.3}Sn_{15}Te_{53.4}$ | 33.3 | ± | ± | + |
| $Ge_{25.3}Sb_{11.8}Sn_{10}Te_{52.9}$ | 35.3 | − | ± | + |
| $Ge_{20.3}Sb_{11.8}Sn_{15}Te_{52.9}$ | 35.3 | − | ± | + |
| $Ge_{26.8}Sb_{10.5}Sn_{10}Te_{52.7}$ | 36.8 | − | ± | + |
| $Ge_{21.8}Sb_{10.5}Sn_{15}Te_{52.7}$ | 36.8 | − | ± | + |
| $Ge_{23.1}Sb_{9.5}Sn_{15}Te_{52.4}$ | 38.1 | − | ± | + |
| $Ge_{18.1}Sb_{9.5}Sn_{20}Te_{52.4}$ | 38.1 | − | ± | + |

FIG. 13

| THICKNESS OF UPPER INTERFACE LAYER (nm) | THICKNESS OF LOWER INTERFACE LAYER (nm) | REPEATED REWRITING TEST (NUMBER OF REWRITING TIMES: $1 \times 10^5$ TIMES) | REFLECTANCE (%) |
|---|---|---|---|
| 1 | 5 | − | + |
| 1.5 | 5 | + | + |
| 2 | 5 | ++ | + |
| 5 | 5 | ++ | + |
| 7 | 5 | ++ | + |
| 15 | 5 | + | + |
| 17 | 5 | + | − |
| 5 | 1 | − | + |
| 5 | 1.5 | + | + |
| 5 | 2 | ++ | + |
| 5 | 5 | ++ | + |
| 5 | 7 | ++ | + |
| 5 | 15 | + | + |
| 5 | 17 | + | − |

FIG. 14

| NITROGEN CONTENT OF UPPER INTERFACE LAYER (at.%) | NITROGEN CONTENT OF LOWER INTERFACE LAYER (at.%) | REPEATED REWRITING TEST (NUMBER OF REWRITING TIMES: $1 \times 10^5$ TIMES) | ERROR RATE |
|---|---|---|---|
| 10 | 30 | − | − |
| 20 | 30 | + | ++ |
| 30 | 30 | ++ | ++ |
| 40 | 30 | ++ | + |
| 50 | 30 | ++ | + |
| 60 | 30 | − | − |
| 30 | 10 | + | ++ |
| 30 | 20 | ++ | ++ |
| 30 | 40 | ++ | ++ |
| 30 | 50 | ++ | + |
| 30 | 60 | ++ | − |

PHASE-CHANGE OPTICAL RECORDING MEDIUM

BACKGROUND OF THE INVENTION

1. Field of the Invention

The present invention relates to a phase-change optical recording medium on which information is recorded and reproduced by being irradiated with a light beam. In particular, the present invention relates to a phase-change optical recording medium which is capable of recording and reproducing information at a high speed.

2. Description of the Related Art

A phase-change optical recording medium is one of rewritable information-recording media. The phase-change optical recording medium comprises a recording layer in which the atomic arrangement is reversibly changed between two different states (between the amorphous and the crystal) by being irradiated with a light beam. Information is recorded on the basis of the two different states of the atomic arrangement of the recording layer. The phase-change optical recording medium is especially cheap among the rewritable media. Therefore, the phase-change optical recording medium has conspicuously come into widespread use for consumer products. In particular, the widespread use is being quickly developed for those concerning recording media for household or domestic video recording media. When the video recording media, which have been hitherto tapes, are replaced with disks of phase-change optical recording media, it is also possible to add new functions such as the time shift reproduction. Therefore, it is required to provide highly sophisticated characteristics exceeding the characteristics of the conventional phase-change optical recording medium having been required for the backup media for computers. For example, in the case of the time shift reproduction, it is necessary that the reproduction should be performed while following images having been just recorded. Therefore, the recording and the reproduction must be switched at a high speed every certain period of time. For this purpose, it is necessary to further increase the access speeds of the recording and the reproduction of information as compared with those having been hitherto used.

In the case of the conventional phase-change optical recording medium, information has been recorded and reproduced by controlling the number of revolutions of the medium in accordance with the CLV (Constant Linear Velocity) system. The CLV system is based on a control method in which the relative velocity (linear velocity) between the light beam and the medium is always constant. That is, in the case of the CLV system, the data transfer rate is always constant during the recording and reproduction. Therefore, it is possible to extremely simplify the signal processing circuit to be used for the recording and reproduction of information. However, in the case of the CLV system, it is necessary that the number of revolutions of the motor is adjusted depending on the radial position of the light beam on the medium so that the linear velocity is constant when the light beam is moved in the radial direction on the medium. Therefore, in the case of the CLV system, the access speed to record and reproduce information is consequently slow.

On the other hand, as for the CAV (Constant Angular Velocity) system which makes it possible to record and reproduce information while maintaining a constant number of revolutions of the medium, it is possible to perform the high speed access, because it is unnecessary to control the number of revolutions of the motor depending on the radial position. However, in the case of the CAV system, the data transfer rate differs depending on the radial position during the recording and reproduction. Therefore, the signal processing circuit, which is used to record and reproduce information, is complicated. Further, in the case of the CAV system, the linear velocity is increased toward the outer circumference of the disk. Therefore, it is necessary to quicken the crystallization speed of the recording layer on the outer circumferential side as compared with the inner circumferential side of the disk. Therefore, in the case of the CAV system, it is necessary to use any special recording layer which makes it possible for the crystallization speed of the recording layer to respond to both of the high linear velocity area on the outer circumferential side and the low linear velocity area on the inner circumferential side of the disk.

In the phase-change optical recording medium, a Ge—Sb—Te-based alloy is generally used as the phase-change material for the recording layer. In order to protect such a recording layer, protective layers, each of which is composed of a dielectric material, are formed on both sides of the recording layer in many cases. Further, in order to avoid the chemical reaction and the atomic diffusion at the interface between the recording layer and the protective layer, a phase-change optical recording medium has been also suggested, in which a barrier layer is provided between a recording layer and a protective layer (see, for example, WO97/34298, pp. 18–22, FIG. 2).

In the phase-change optical recording medium having the conventional recording layer based on the use of the Ge—Sb—Te-based phase-change material, the high speed of the crystallization speed of the recording layer is principally realized by adding Sn to the recording layer. However, in spite of the fact that the high speed of the crystallization speed can be realized by adding Sn to the recording layer, the melting point of the recording layer is consequently increased. Therefore, it is necessary to record information by using a light beam having a higher output. If information is repeatedly rewritten with the high output light beam, the following problem has been caused. That is, the information recording and reproducing characteristics (for example, the signal output, the jitter, the reflectance, and the recording sensitivity) are suddenly deteriorated as compared with a case in which a light beam having a low output is used. Specifically, the following problem arises. That is, if information is repeatedly rewritten with a high output light beam, then the difference in refractive index of the recording layer is decreased between the crystalline state and the non-crystalline state (amorphous state), and the output of the reproduced signal is consequently decreased.

The Ge—Sb—Te-based alloy, which is used for the phase-change recording material, has such a feature that the difference in refractive index between the crystal and the amorphous is increased as the composition of GeTe is increased. Therefore, in the case of the phase-change optical recording medium, the output of the reproduced signal is also increased as the composition of GeTe of the recording layer is increased. However, as shown in a phase diagram of GeTe—$Sb_2Te_3$ in FIG. 10 (see V. S. Zemskov et. al., Handbook of Semiconductor System Solid Solution, published by NISSO), the melting point of the Ge—Sb—Te-based alloy is raised as the composition of GeTe is increased in an area in which the composition of GeTe is not less than 50 mol. %. Therefore, if a phase-change material in this composition area is used as a recording layer, the repeated rewriting characteristic is deteriorated, because the melting point is raised as the composition of GeTe is increased. That is, in this case of the phase-change optical recording medium, when the composition of GeTe of the recording layer is increased, then the difference in refractive index between the crystal and the non-crystal is increased, and the reproduced signal output is increased. However, the melting point is raised, and the repeated rewriting characteristic is deteriorated. Therefore, the phase-change optical recording medium based on the use of the phase-change material in this composition area has involved such a problem that it is extremely difficult to satisfy both of the reproduced signal output characteristic and the repeated rewriting characteristic.

A principal cause of the deterioration of the repeated rewriting characteristic is as follows. That is, when information is repeatedly rewritten, the phase-change optical recording medium is repeatedly heated by the light beam. Therefore, the recording layer and the dielectric protective layer composed of ZnS—$SiO_2$ or the like adjoining the recording layer undergo the following interaction. That is, the constitutive elements of one of the both layers mutually make invasion or diffusion into the other, and/or the constitutive elements of the both layers mutually cause any chemical reaction. In order to avoid the invasion, the diffusion, and the chemical reaction of the constitutive elements of the both layers, for example, a method is suggested in WO97/34298 (pp. 18–22, FIG. 2), in which a nitride of Ge—N, Ge—Cr—N or the like is interposed as an interface layer between the recording layer and the dielectric protective layer. Phase-change optical recording media, each of which is provided with the interface layer as described above, are disclosed, for example, in Japanese Patent Application Laid-open Nos. 10-289478, 11-167746, 11-238249, 11-339316, 2001-126312, 2002-74739, and 2002-74747.

At present, it is requested for the phase-change optical recording medium to further realize a high density of information and a high speed of recording and reproduction. In order to respond to this request, it is necessary to use a phase-change material which has a melting point of a recording layer higher than those hitherto used. For example, $Ge_2Sb_{2.3}Te_5$ (relative ratio), which is used as a phase-change material in WO97/34298 (pp. 18–22, FIG. 2), has a melting point of about 630° C. However, for example, $Bi_7Ge_{41}Te_{52}$ (at. %), which is suitable for the realization of high speed, has a melting point of at least not less than 700° C. As shown in a phase diagram of GeTe—$Bi_2Te_3$ in FIG. 11 (see V. S. Zemskov et. al., Handbook of Semiconductor System Solid Solution, published by NISSO), the following fact has been revealed in the same manner as in the Ge—Sb—Te system. That is, the melting point is raised as the ratio of GeTe is increased in an area in which the ratio of GeTe is not less than about 25 mol % in the Bi—Ge—Te-based alloy as well. It is doubtless that the change will be made in such a tendency that the ratio of GeTe is further increased, i.e., the composition will be changed toward the Ge-rich area in future in the case of the phase-change material of the Ge—Sb—Te system and the Bi—Ge—Te system. It is inevitable that the melting point of the recording layer will be further raised in the phase-change optical recording medium. As for the phase-change optical recording medium based on the use of the high melting point phase-change material as described above, it is considered that any excellent repeated rewriting characteristic is not obtained with the interface layer of Ge—N or Ge—Cr—N having been hitherto used for the low melting point phase-change optical recording medium.

SUMMARY OF THE INVENTION

An object of the present invention is to provide a phase-change optical recording medium which is capable of recording and reproducing information at a high speed, wherein the reproduced signal output is not only sufficiently large, but the excellent repeated rewriting characteristic is also provided.

According to a first aspect of the present invention, there is provided a phase-change optical recording medium for recording and reproducing information by being irradiated with a light beam, the phase-change optical recording medium comprising a recording layer containing Bi, Ge, and Te, and an interface layer which contains Ge, Si, and N and which is formed in contact with at least one side of the recording layer.

In the phase-change optical recording medium according to the first aspect, it is preferable that a content of Ge in the recording layer is 30 at. % to 50 at. %.

According to a verifying experiment performed by the inventors, the following fact has been revealed. That is, when the phase-change material based on the Bi—Ge—Te system, in which Sb of an Ge—Sb—Te-based alloy is substituted with Bi, is used as the phase-change material to be used for the recording layer of the phase-change optical recording medium, the Bi—Ge—Te-based phase-change material not only maintains such an advantage of GeTe that the difference in refractive index between the crystal and the non-crystal is large, but the crystallization speed is also rapid, wherein the characteristics possessed thereby are more excellent than those possessed by the Ge—Sb—Te system. However, when the Bi—Ge—Te-based alloy having the excellent characteristics as described above is used for the recording layer of the phase-change optical recording medium, the melting point of the Bi—Ge—Te-based alloy is higher (melting point: not less than about 640° C.), for example, than that of $Ge_2Sb_2Te_5$ (as represented by the relative ratio, $Ge_{22.2}Sb_{22.2}Te_{55.6}$ (at. %) as represented by the atomic ratio) to be used for the conventional phase-change material, in the practically usable composition range (content of Ge contained in the recording layer is 30 at. % to 50 at. %). Therefore, if the Bi—Ge—Te-based alloy, which is included in the composition range as described above, is used as the recording layer, it is necessary that information is recorded and reproduced with a high output light beam. For this reason, when information is repeatedly rewritten, the information-recording and reproducing characteristic (repeated rewriting characteristic) is suddenly deteriorated. However, as described above, it is necessary to use the phase-change material having the high melting point in order to achieve the high density of information and the high speed of the recording and reproduction on the phase-change optical recording medium. Accordingly, it has been demanded to develop a phase-change optical recording medium which has an excellent repeated rewriting characteristic even in the case of the use of the high melting point phase-change material such as those based on the Bi—Ge—Te system.

The present invention has been made in order to respond to the demand as described above. As a result of diligent investigations performed by the inventors, it has been found out that the phase-change optical recording medium, which has not only the sufficiently large output of the reproduced signal but also the excellent repeated rewriting characteristic, is obtained by providing the interface layer formed of the material containing Ge, Si, N in contact with at least one side of the recording layer formed of the phase-change material containing Bi, Ge, and Te.

The following two factors are pointed out as the cause of the improvement in repeated rewriting characteristic by using the interface layer formed of the material containing at least Ge, Si, and N in place of the conventional interface layer formed of Ge—N or Ge—Cr—N. (1) The melting point of the interface layer is raised and the durability against the heat applied from the outside is enhanced by containing Si (melting point: 1,414° C.) having the melting point higher than the melting point of 958.8° C. of Ge as the constitutive element, in the interface layer of Ge—N having had the certain effect on the repeated rewriting characteristic for the conventional low melting point recording layer. (2) Si is a homologous element of Ge. Therefore, when Si is contained in the interface layer in place of Cr, the bond between Ge and Si at the interface layer of Ge—Si—N is strengthened as compared with the bond between Ge and Cr at the interface layer of Ge—Cr—N, and the bonding stability is enhanced between the constitutive elements of the interface layer. This avoids the chemical reaction, the diffusion, and the invasion of the mutual constitutive elements at the interface between the protective layer and the recording layer described above. It has been revealed that the repeated rewriting characteristic is improved owing to the two effects described above even in the case of the phase-change optical recording medium based on the use of the high melting point phase-change material which has been hitherto difficult to be used as the recording layer, for example, the phase-change material such as the Bi—Ge—Te-based alloy having the content of Ge of 30 at. % to 50 at. %. Therefore, according to the present invention, the phase-change optical recording medium is obtained with ease, in which the reproduced signal output is sufficiently large, and the excellent repeated rewriting characteristic is provided. In particular, it is possible to use the material having an extremely high melting point of not less than 700° C. such as $Bi_7Ge_{41}Te_{52}$ (at. %), as the recording layer for the phase-change optical recording medium.

According to a second aspect of the present invention, there is provided a phase-change optical recording medium for recording and reproducing information by being irradiated with a light beam, the phase-change optical recording medium comprising a recording layer containing Ge, Sb, and Te, and an interface layer which contains Ge, Si, and N and which is formed in contact with at least one side of the recording layer.

In the phase-change optical recording medium according to the second aspect, it is preferable that a content of Ge in the recording layer is 30 at. % to 50 at. %.

When the Ge—Sb—Te-based alloy is used for the recording layer, if the Ge—Sb—Te-based alloy, which has a composition with a content of Ge of 30 at. % to 50 at. %, is used, then the melting point is higher than, for example, that of $Ge_2Sb_2Te_5$ (relative ratio) to be used for the conventional recording layer. However, also in the case of the phase-change optical recording medium according to the second aspect of the present invention, the interface layer, which contains Ge, Si, and N, is provided in contact with at least one side of the recording layer in the same manner as in the phase-change optical recording medium according to the first aspect. Therefore, the excellent repeated rewriting characteristic is obtained.

In the phase-change optical recording medium according to the second aspect, it is preferable that the recording layer further contains Sn, and the total content of Sn and Ge in the recording layer is 30 at. % to 50 at. %. When the Ge—Sb—Sn—Te-based alloy is used for the recording layer, if the Ge—Sb—Sn—Te-based alloy having the composition in which the total content of Ge and Sn is 30 at. % to 50 at. % is used, the melting point is higher, for example, than that of $Ge_2Sb_2Te_5$ to be used for the conventional recording layer. However, the excellent repeated rewriting characteristic is obtained, because the interface layer formed of the material containing Ge, Si, and N is provided in contact with at least one side of the recording layer.

In the phase-change optical recording medium of the present invention, it is preferable that the atomic ratio Ge:Si in the interface layer is 90:10 to 40:60. Such an interface layer is preferably formed by sputtering. It is preferable that a target, in which an atomic ratio Ge:Si is 90:10 to 40:60, is used for the sputtering.

As for the interface layer of the phase-change optical recording medium of the present invention, when a layer composed of only Si—N is used without adding Ge, the obtained phase-change optical recording medium is more excellent in repeated rewriting characteristic than the phase-change optical recording medium in which Ge—Si—N is used for the interface layer, because the melting point of Si is higher than that of Ge. However, when Si—N is used for the interface layer, any film exfoliation tends to occur, because the adhesion performance is poor between the recording layer and the interface layer. On the other hand, when Ge—N is used for the interface layer of the phase-change optical recording medium, no film exfoliation takes place. However, if Ge—N is used for the high melting point phase-change optical recording medium, the repeated rewriting characteristic is deteriorated. Further, if Si—N or Ge—N is used for the interface layer, a part of Ge or Si remains in many cases without being nitrided, because it is difficult to completely nitride both of Ge and Si. In such a situation, the film uniformity of the interface layer is deteriorated, and any noise is caused. In another case, a problem arises such that the bonding force between the atoms is lowered. Therefore, it is preferable that the interface layer contains both of Ge and Si. It is preferable that the atomic ratio Ge:Si in the interface layer containing Ge, Si, and N is 90:10 to 40:60.

According to a third aspect of the present invention, there is provided a phase-change optical recording medium for recording and reproducing information by being irradiated with a light beam, the phase-change optical recording medium comprising a recording layer containing Bi, Ge, and Te, and interface layers each of which contains Ge, Si, and N and which are formed in contact with both sides of the recording layer.

In the phase-change optical recording media according to the first, second, and third aspects, it is preferable that the interface layer has a thickness of 1.5 nm to 15 nm.

In the phase-change optical recording media according to the first, second, and third aspects, it is preferable that a content of nitrogen in the interface layer is 20 at. % to 50 at. %.

According to the phase-change optical recording medium of the present invention, the interface layer, which contains at least Ge, Si, and N, is formed in contact with at least one side of the recording layer. Accordingly, even in the case of the phase-change optical recording medium which has the recording layer based on the use of the phase-change material having the high melting point like the Bi—Ge—Te-based alloy, the output of the reproduced signal is sufficiently large, and the excellent repeated rewriting performance is obtained.

BRIEF DESCRIPTION OF THE DRAWINGS

FIG. 5 shows results of the film exfoliation characteristic of the phase-change optical recording medium manufactured in Example 2.

FIG. 8 shows results of a repeated rewriting test for the phase-change optical recording media manufactured in Example 4.

FIG. 9 shows results of a repeated rewriting test for the phase-change optical recording media manufactured in Example 5.

FIG. 13 shows results of a repeated rewriting test and reflectance for phase-change optical recording media manufactured in Example 6.

FIG. 14 shows results of a repeated rewriting test and shelf characteristic for phase-change optical recording media manufactured in Example 6.

DESCRIPTION OF THE PREFERRED EMBODIMENTS

The phase-change optical recording medium of the present invention will be specifically explained in the following embodiments. However, the present invention is not limited thereto.

EXAMPLE 1

Figure 1:
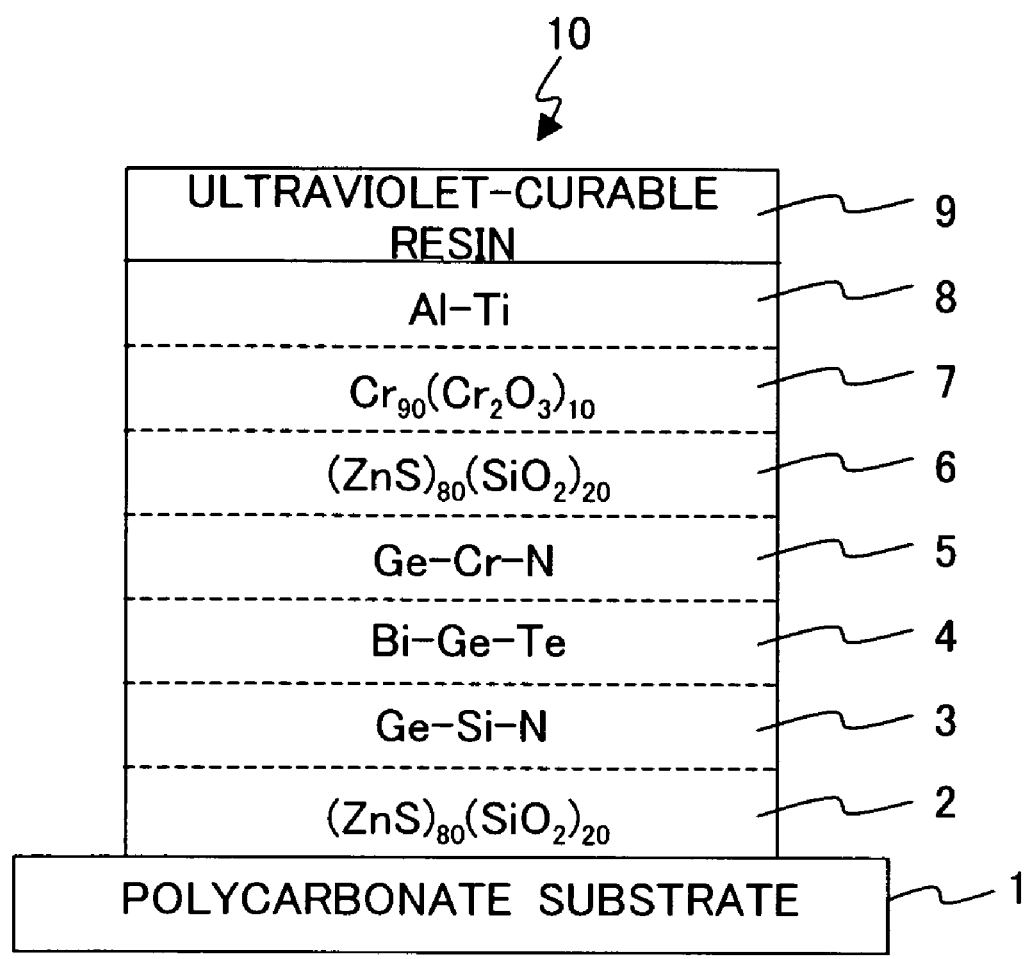
FIG. 1 shows a schematic sectional view illustrating a phase-change optical recording medium manufactured in Example 1.

FIG. 1 shows a schematic sectional view illustrating a phase-change optical recording medium manufactured in Example 1. As shown in FIG. 1, the phase-change optical recording medium 10 manufactured in Example 1 has a structure in which a lower dielectric layer 2, a lower interface layer 3, a recording layer 4, an upper interface layer 5, an upper dielectric layer 6, an adjusting layer 7, a heat release layer 8, and a protective layer 9 are successively stacked on a substrate 1. The recording layer 4 is a layer on which information is recorded in accordance with the two different states (crystalline state and amorphous state) of atomic arrangement in a phase-change material. The lower dielectric layer 2 and the upper dielectric layer 6 are layers to protect the recording layer 4. The lower interface layer 3 is a layer to avoid any mutual invasion, diffusion, and chemical reaction of the constitutive elements of the both layers of the lower dielectric layer 2 and the recording layer 4. The upper interface layer 5 is a layer to avoid any mutual invasion, diffusion, and chemical reaction of the constitutive elements of the both layers of the upper dielectric layer 6 and the recording layer 4. The adjusting layer 7 is a layer to further increase the absorption factor of the crystalline portion in the recording layer 4 as compared with the absorption factor of the non-crystalline or amorphous portion by absorbing a part of the laser beam. The heat release layer 8 is a layer to release the heat generated during the recording and reproduction of information. The protective layer 9 is a layer to protect the respective layers 2 to 8.

Next, an explanation will be made about a method for producing a phase-change optical recording medium manufactured in Example 1. At first, a disk-shaped substrate made of polycarbonate having a diameter of 120 mm was prepared as the substrate 1. The substrate 1 was formed by the injection molding, and the substrate 1 had the following structure. That is, tracking pregrooves, which had a track pitch of 615 nm and a groove depth of 65 nm, were formed in a helical form on the surface of the substrate 1. The groove and the land were linked and related alternately and continuously.

Subsequently, $(ZnS)_{80}(SiO_2)_{20}$ (mol %) was formed as the lower dielectric layer 2 to have a thickness of 135 nm on the substrate 1 by the sputtering.

Subsequently, $(Ge_{80}Si_{20})_{50}N_{50}$ (at. %) was formed as the lower interface layer 3 to have a thickness of 7 nm on the lower dielectric layer 2. The lower interface layer 3 was formed by performing sputtering with a target of $Ge_{80}Si_{20}$ (at. %) in an Ar—$N_2$ gas atmosphere.

Subsequently, $Bi_7Ge_{41}Te_{52}$ (at. %) was formed as the recording layer 4 to have a thickness of 8 nm on the lower interface layer 3. The recording layer 4 was formed by performing the sputtering with a target of $Bi_7Ge_{41}Te_{52}$ (at. %) in an Ar gas atmosphere. In Example 1, the recording layer 4 was initially crystallized.

Subsequently, $(Ge_{80}Cr_{20})_{50}N_{50}$ (at. %) was formed as the upper interface layer 5 to have a thickness of 5 nm on the recording layer 4. The upper interface layer 5 was formed by performing the sputtering with a target of $Ge_{80}Cr_{20}$ (at. %) in an Ar—$N_2$ gas atmosphere.

Further, $(ZnS)_{80}(SiO_2)_{20}$ (mol %) was formed as the upper dielectric layer 6 to have a thickness of 33 nm on the upper interface layer 5 by the sputtering. Subsequently, $Cr_{90}(Cr_2O_3)_{10}$ (mol %) was formed as the adjusting layer 7 to have a thickness of 40 nm on the upper dielectric layer 6 by the sputtering. Further, $Al_{99}Ti_1$ (wt. %) was formed as the heat release layer 8 to have a thickness of 150 nm on the adjusting layer 7 by the sputtering. Finally, an ultraviolet-curable resin was formed as the protective layer 9 to have a thickness of 7 μm on the heat release layer 8. The phase-change optical recording medium 10 shown in FIG. 1 was obtained in accordance with the production method as described above.

In the case of the phase-change optical recording medium manufactured in Example 1, information is recorded on both of the land and the groove (land-groove recording). The data on the medium comprises a read-in area composed of emboss (pits), a rewritable read-in area, a data area composed of 35 zones, and a rewritable read-out area. Both of the groove and the land have sectors. Each of the sectors is divided into a header area, a mirror area, and 2048-bite recording area. Further, the header area is divided into four areas (first to fourth areas), existing between the groove and the land. The first and second areas of the header are arranged on the outer circumferential side of the land track as viewed from the land track. The third and fourth areas are arranged on the inner circumferential side of the land track.

Next, an explanation will be made about an information-recording apparatus for evaluating the characteristics of the phase-change optical recording medium manufactured in Example 1 (repeated rewriting test). Example 1 is based on the use of the information-recording apparatus comprising a semiconductor laser (wavelength: 655 nm, numerical aperture: 0.6) for irradiating the phase-change optical recording medium with a light beam during recording and reproduction of information, a laser driver for controlling the output of the semiconductor laser, a waveform-generating unit for generating the recording pulse generated in accordance with recording information, a waveform equivalence circuit, and a binary circuit.

The 8–16 modulation was used for the information-recording apparatus adopted in Example 1, and information was recorded by forming recording marks based on the mark edge recording system on the phase-change optical recording medium. The shortest mark length was 0.42 μm. In Example 1, a random pattern of 3T to 14T was recorded as information on the phase-change optical recording medium. The random pattern was reproduced to evaluate the characteristics of the phase-change optical recording medium. In Example 1, information was recorded and reproduced at a low linear velocity of 8.2 m/s and a high linear velocity of 20.5 m/s to evaluate the characteristics thereof respectively. The length of 1T is 17.13 ns at the low linear velocity of 8.2 m/s and 6.852 ns at the high linear velocity of 20.5 m/s.

In Example 1, the evaluation was made for the jitter obtained after performing the rewriting $10^5$ times, the amount of decrease in reflectance (reflectance after performing the rewriting $10^5$ times/initial reflectance), and the degree of modulation (3T amplitude/14T amplitude×100). Consequently, the following results were obtained. That is, the jitter was 8.65%, the amount of decrease in reflectance was 84.5%, and the degree of modulation was 54% at the low linear velocity of 8.2 m/s. The jitter was 8.17%, the amount of decrease in reflectance was 82.9%, and the degree of modulation was 50.3% at the high linear velocity of 20.5 m/s.

COMPARATIVE EXAMPLE 1

Figure 2:
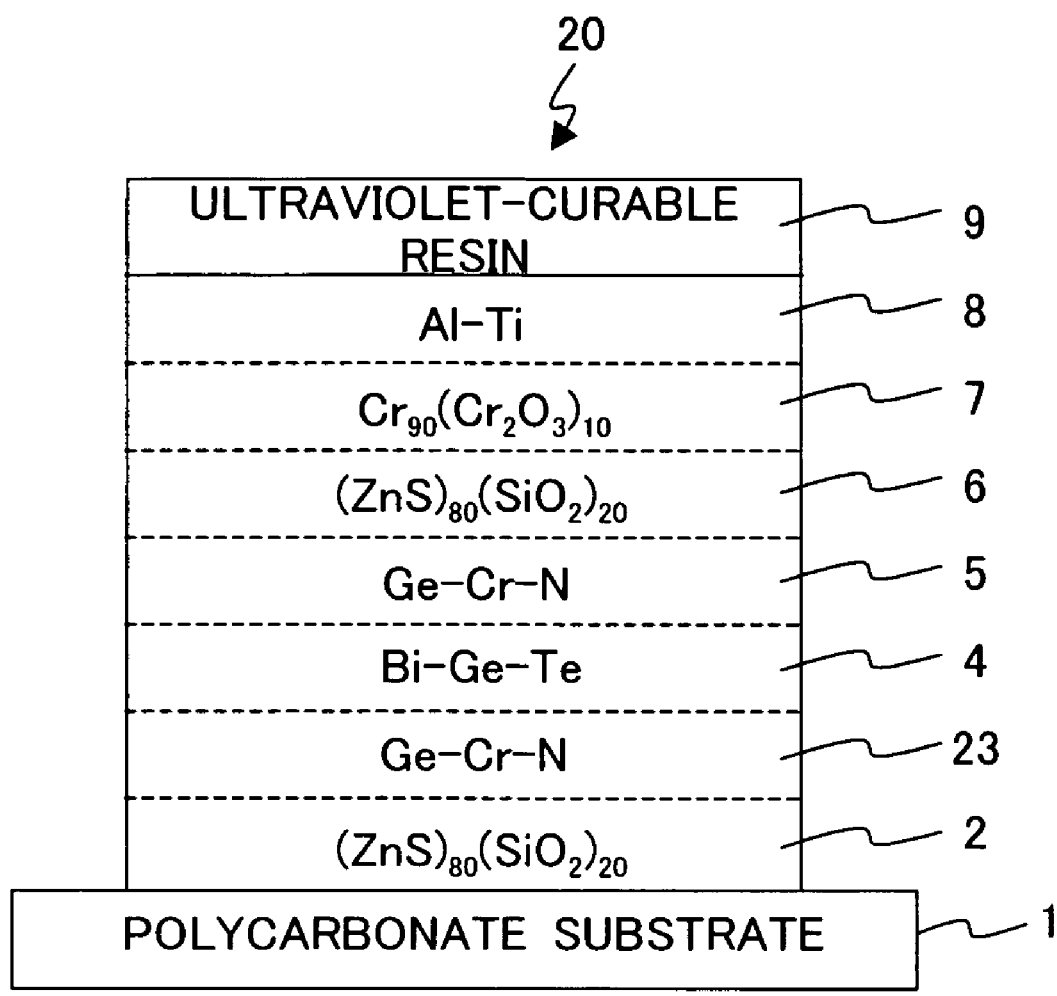
FIG. 2 shows a schematic sectional view illustrating a phase-change optical recording medium manufactured in Comparative Example 1.

FIG. 2 shows a schematic sectional view illustrating a phase-change optical recording medium manufactured in Comparative Example 1. The phase-change optical recording medium manufactured in Comparative Example 1 is a conventional phase-change optical recording medium. As shown in FIG. 2, the phase-change optical recording medium was manufactured in the same manner as in Example 1 except that a lower interface layer 23 was formed of $(Ge_{80}Cr_{20})_{50}N_{50}$ (at. %).

The repeated rewriting test was also performed for the phase-change optical recording medium of Comparative Example 1 in the same manner as in Example 1. As a result, approximately the same results as those obtained in Example 1 were obtained at the low linear velocity of 8.2 m/s for the amount of decrease in reflectance and the degree of modulation. However, the jitter was increased to be not less than 13% at a point of time at which the rewriting was performed $7\times10^4$ times. On the other hand, approximately the same results as those obtained in Example 1 were obtained for all of the evaluation items at the high linear velocity of 20.5 m/s.

As clarified from the evaluation results of Example 1 and Comparative Example 1, approximately the same results were obtained for the both for all of the evaluation items in the repeated rewriting test at the high linear velocity of 20.5 m/s. However, the evaluation results of the both differed in the repeated rewiring test at the low linear velocity of 8.2 m/s. The jitter obtained after performing the repeated rewriting $10^5$ times was higher for the phase-change optical recording medium of Comparative Example 1 as compared with the phase-change optical recording medium of Example 1. That is, it has been revealed that the repeated rewriting characteristic is improved by forming the interface layer (lower interface layer 3 in Example 1) composed of Ge—Si—N on one side of the recording layer 4 in the case of the phase-change optical recording medium based on the use of the Bi—Ge—Te-based alloy for the recording layer 4, probably for the following reason. That is, it is considered that the melting point of the interface layer is raised to be highly resistant to the heat applied from the outside, and the interatomic bond for constructing the interface layer is strengthened by using the material (Ge—Si—N) in which Cr of Ge—Cr—N is substituted with Si as the homologous element of Ge.

EXAMPLE 2

Figure 3:
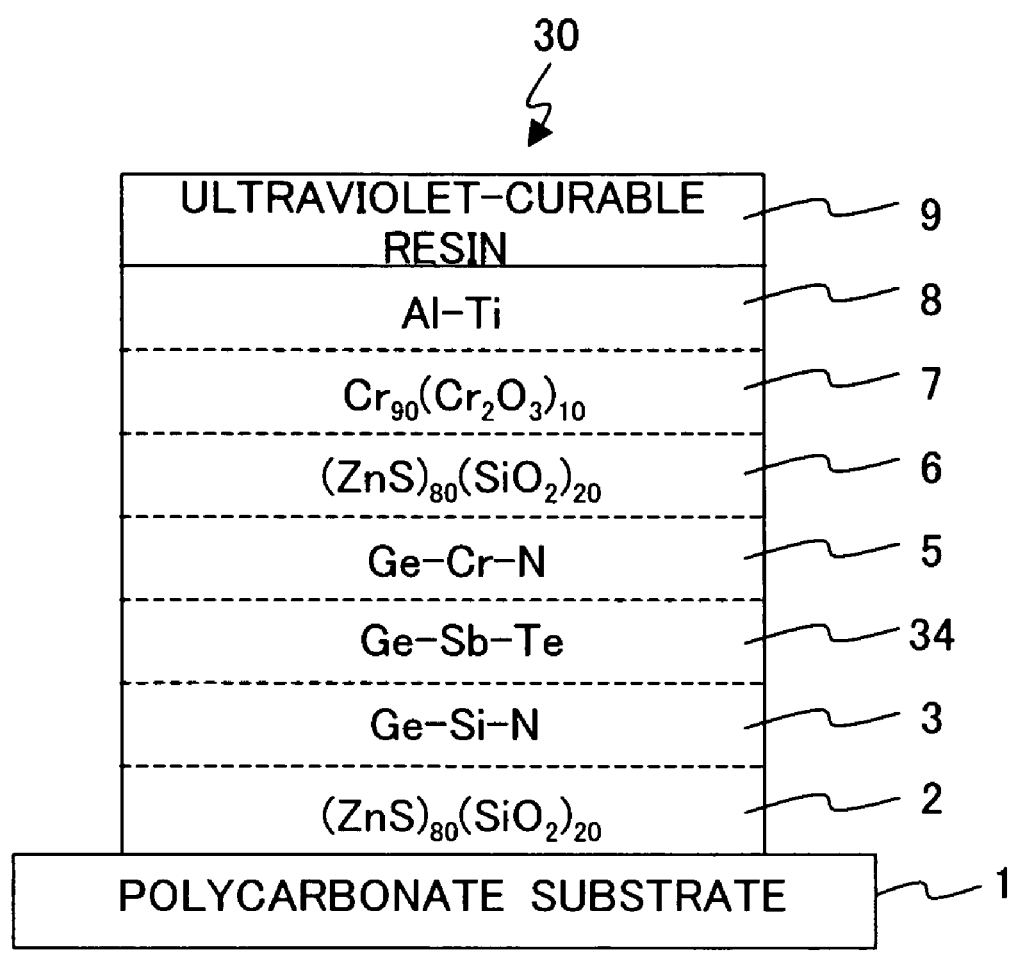
FIG. 3 shows a schematic sectional view illustrating a phase-change optical recording medium manufactured in Example 2.

FIG. 3 shows a schematic sectional view illustrating a phase-change optical recording medium manufactured in Example 2. In Example 2, the phase-change optical recording medium was manufactured in the same manner as in Example 1 except that the constitutive material for the recording layer 34 was $Ge_6Sb_2Te_9$ (relative ratio). In Example 2, five types of phase-change optical recording media were manufactured respectively, in which the atomic ratio Ge:Si in Ge—Si—N for forming the lower interface layer 3 was 100:0, 80:20, 60:40, 40:60, and 20:80. The repeated rewriting test was performed for the respective phase-change optical recording media in the same manner as in Example 1.

Figure 4:
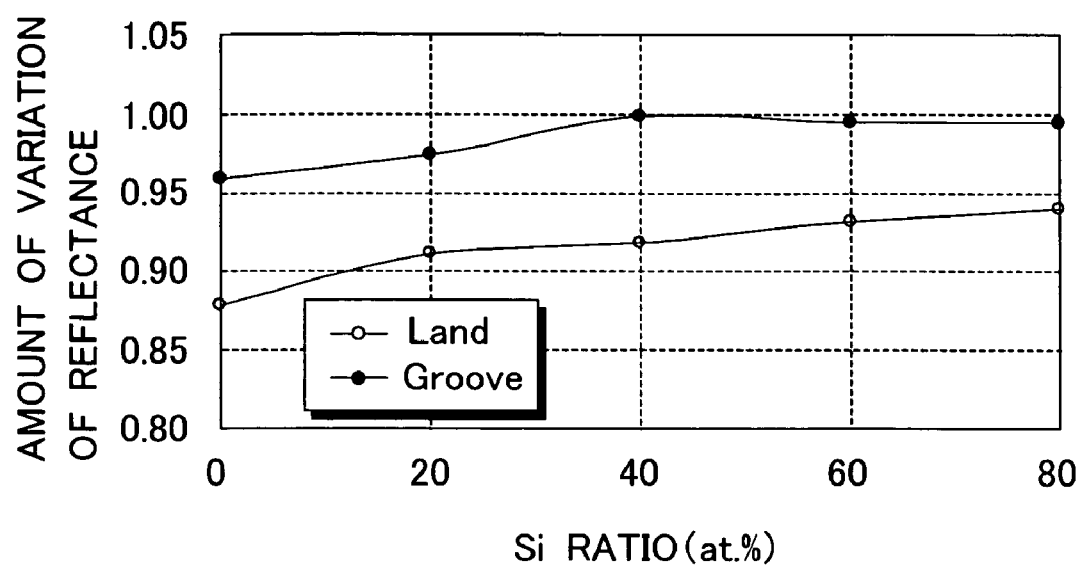
FIG. 4 shows the amount of variation of reflectance after performing a rewriting test repeatedly $10^4$ times for the phase-change optical recording medium manufactured in Example 2.

FIG. 4 shows results of the repeated rewriting characteristic at the low linear velocity (8.2 m/s). In FIG. 4, the horizontal axis indicates the Si ratio in Ge—Si—N for forming the lower interface layer 3, and the vertical axis indicates the amount of variation of reflectance after performing the rewriting $10^4$ times (reflectance after performing the rewriting $10^4$ times/initial reflectance). However, the Si ratio indicated by the horizontal axis shown in FIG. 4 is the ratio of Si with respect to Ge. Therefore, for example, when Si is X (at. %), Ge is 100−X (at. %). For the purpose of comparison, the reflectances obtained for the land and the groove are depicted in FIG. 4 respectively.

As clarified from FIG. 4, the following fact has been revealed. That is, as for both of the amounts of variation of reflectance obtained from the land and the groove, as the Si ratio becomes smaller, i.e., as the ratio of Ge becomes larger, the amount of variation of reflectance becomes lower. Further, as the ratio Ge:Si becomes more approximate to Ge:Si=100:0, the degree of decrease in the amount of variation of reflectance becomes larger, probably for the following reason. That is, when the amount of Si having the melting point higher than that of Ge is large, the melting point of the lower interface layer 3 is raised. The durability is enhanced against the heat applied from the outside.

Next, the film exfoliation characteristic was evaluated for the five phase-change optical recording media manufactured in Example 2. The film exfoliation was evaluated as follows. That is, the phase-change optical recording medium was left to stand in a high temperature and high humidity environment (in air, temperature: 80° C., humidity: 80%, time: 48 hours), and then the situation of film exfoliation of the phase-change optical recording medium was investigated. Obtained results are shown in FIG. 5. As clarified from FIG. 5, no film exfoliation was caused in the case of the phase-change optical recording media in which ratio Ge:Si are 100:0, 80:20, and 60:40, respectively, even after the storage in the high temperature and high humidity environment (evaluation of "+" in FIG. 5). In the case of the phase-change optical recording medium in which the ratio Ge:Si is 40:60, although the film exfoliation was slightly caused, no practical problem was caused at all (evaluation of "±" in FIG. 5). However, in the case of the phase-change optical recording medium in which the ratio Ge:Si is 20:80, the film exfoliation was conspicuous, and the medium was unsuccessful to be used in this state (evaluation of "−" in FIG. 5).

Considering the results of the repeated rewriting characteristic (FIG. 4) and the film exfoliation characteristic (FIG. 5) evaluated in Example 2, it has been revealed that the atomic ratio Ge:Si in the interface layer formed of Ge—Si—N is preferably within a range of Ge:Si=90:10 to 40:60.

In Example 2, $Ge_6Sb_2Te_9$ (relative ratio, melting point: about 640° C.) is used as the recording layer, which has the melting point higher than that of $Ge_2Sb_2Te_5$ (relative ratio). However, the same or equivalent effect is expected even in the case of the use of any phase-change material, for example, $Ge_8Sb_2Te_{11}$ (relative ratio, melting point: about 650° C.) in which the composition is more Ge-rich (having the higher melting point). Therefore, when the phase-change material having the higher melting point such as $Ge_8Sb_2Te_{11}$ (relative ratio) is used as the recording layer, it is possible to further expect the realization of the high density of information and the high speed of recording and reproduction.

EXAMPLE 3

Figure 6:
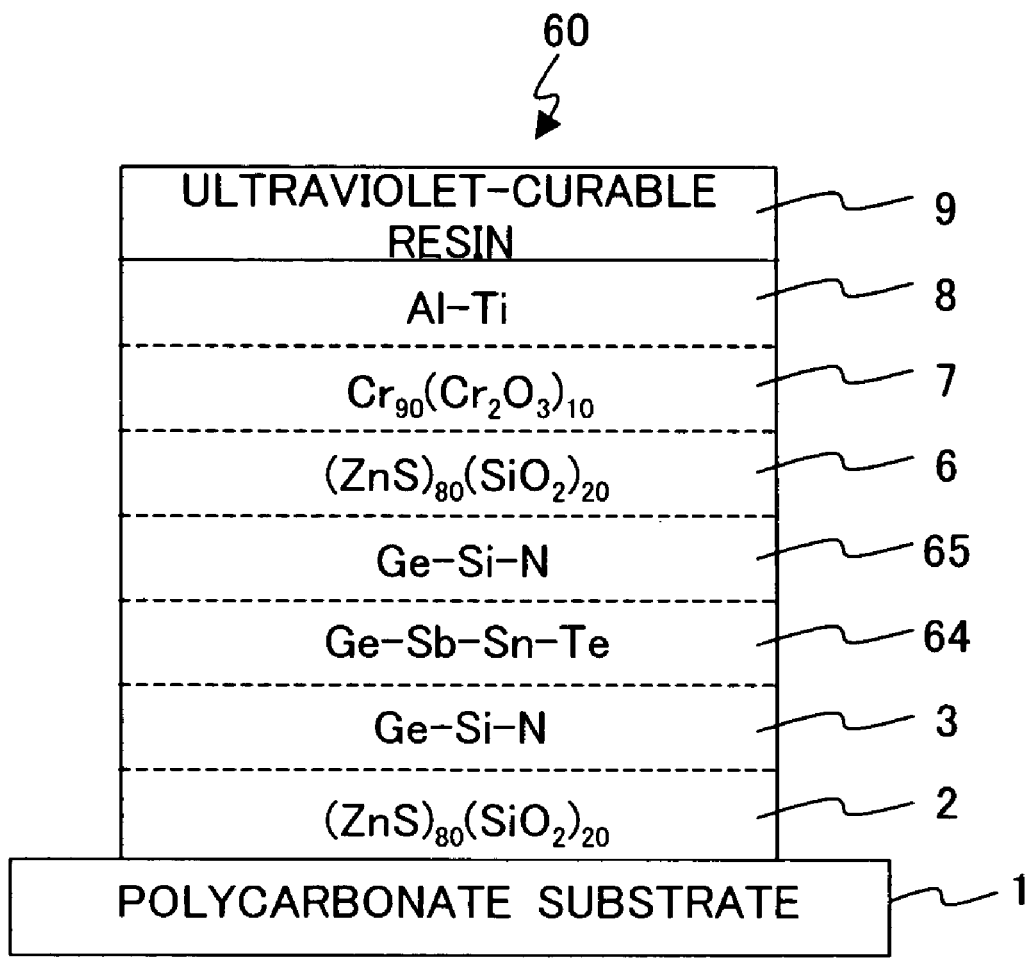
FIG. 6 shows a schematic sectional view illustrating a phase-change optical recording medium manufactured in Example 3.

FIG. 6 shows a schematic sectional view illustrating a phase-change optical recording medium manufactured in Example 3. As shown in FIG. 6, the phase-change optical recording medium 60 manufactured in Example 3 was produced in the same manner as in Example 1 except that $Ge_{25.3}Sb_{11.8}Sn_{10}Te_{52.9}$ (at. %) was used for a phase-change material of a recording layer 64, and an upper interface layer 65 was formed of Ge—Si—N. However, the recording layer 64 was formed by performing the sputtering with a target of $Ge_{25.3}Sb_{11.8}Sn_{10}Te_{52.9}$ (at. %) in an Ar gas atmosphere, and the upper interface layer 65 was formed by performing the sputtering with a target of $Ge_{80}Si_{20}$ (at. %) in an Ar—$N_2$ gas atmosphere.

In Example 3, when the upper interface layer 65 is formed by the sputtering, a variety of phase-change optical recording media were manufactured by changing the $N_2$ partial pressure in the Ar—$N_2$ sputtering gas to be at ten levels, i.e., 6, 10, 14, 18, 22, 26, 36, 50, 65, and 78%. The repeated rewriting test was performed in the same manner as in Example 1 for the respective phase-change optical recording media manufactured in Example 3. In Example 3, information was recorded and reproduced at a low linear velocity (8.2 m/s).

Figure 7:
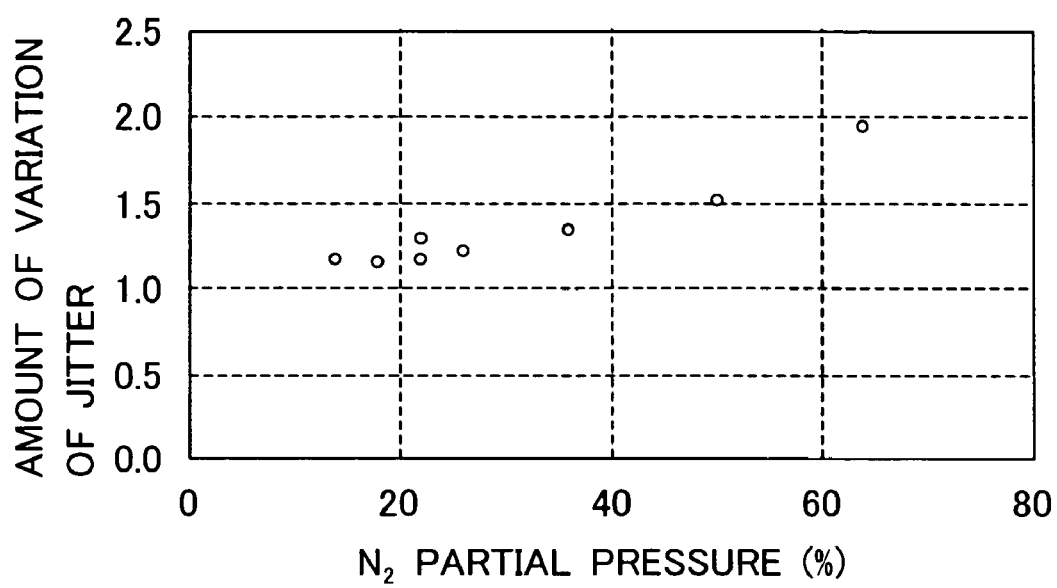
FIG. 7 shows the amount of variation of jitter after performing a rewriting test repeatedly $10^5$ times for the phase-change optical recording medium manufactured in Example 3.
Figure 10:
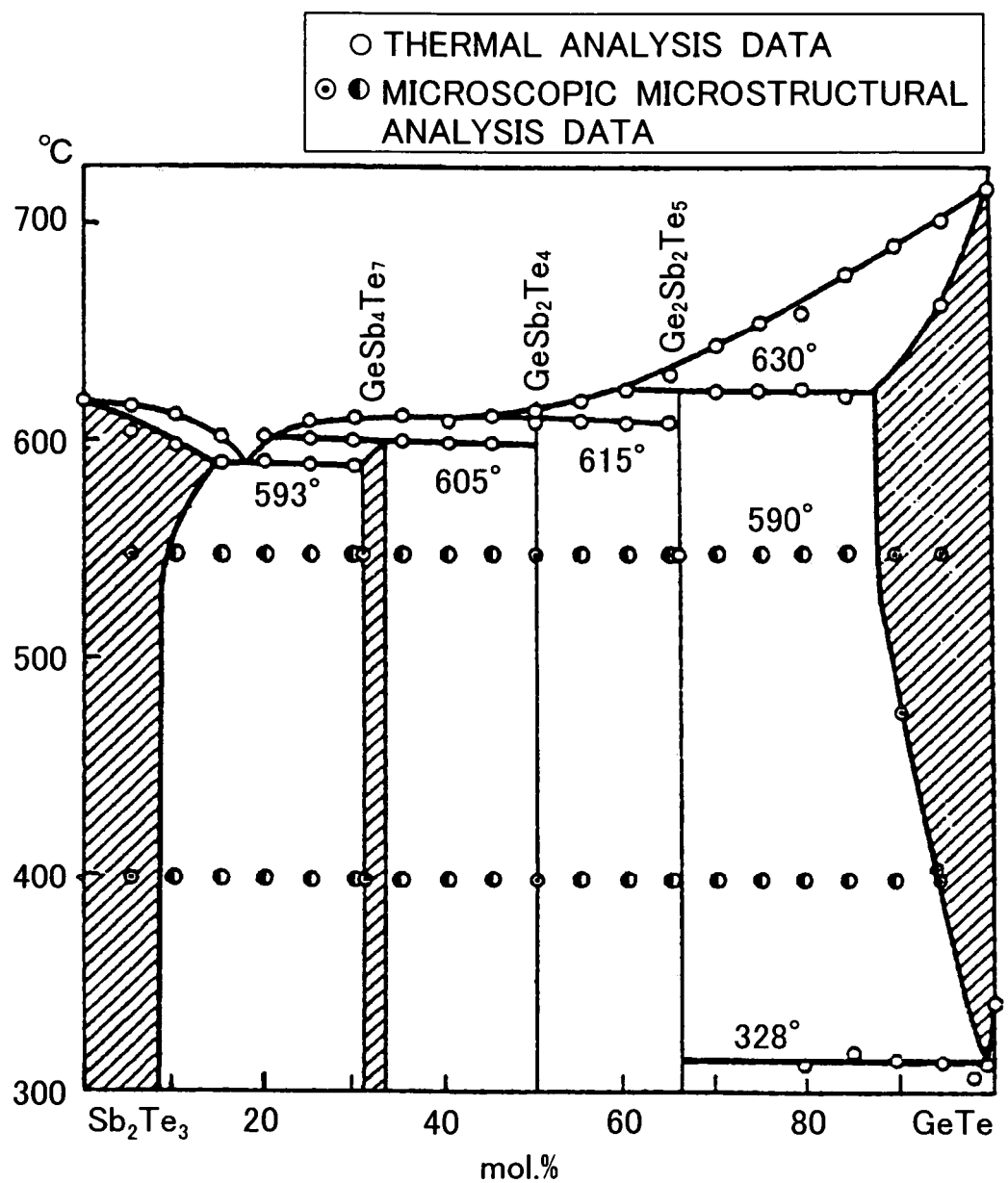
FIG. 10 shows a phase diagram of a GeTe—$Sb_2Te_3$-based material.
Figure 11:
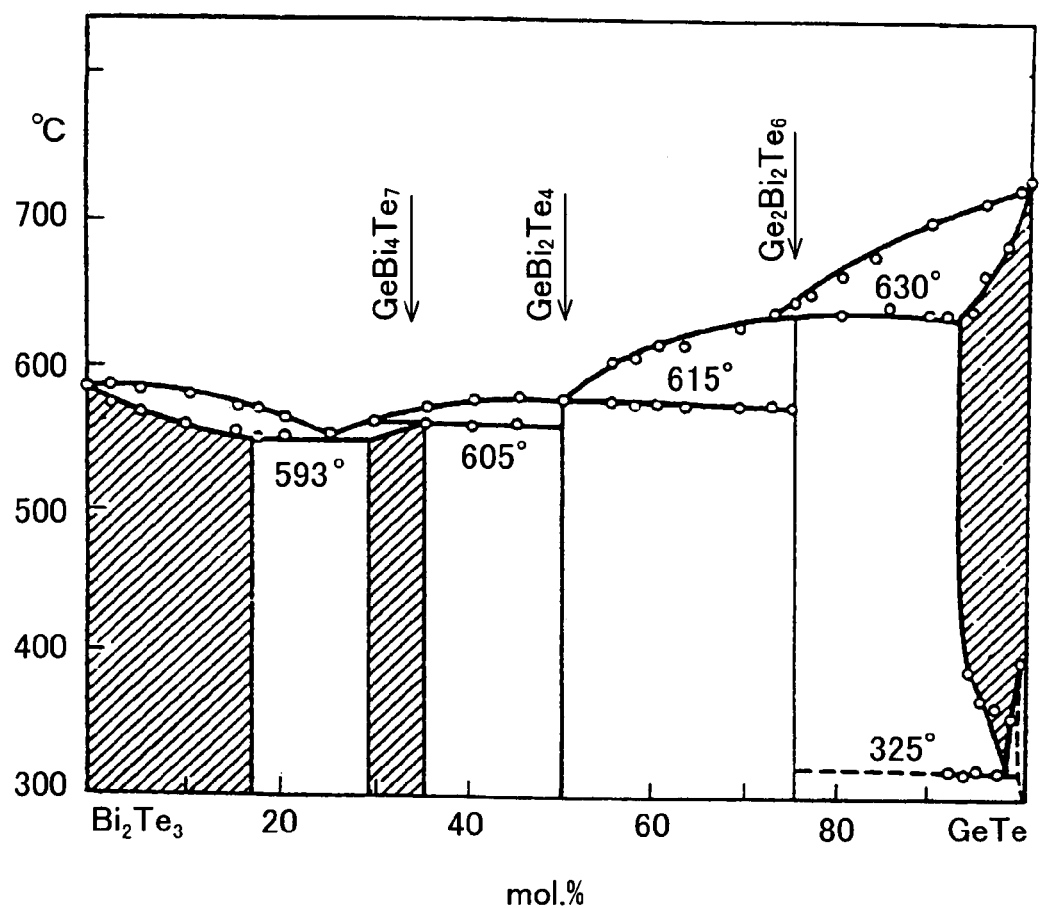
FIG. 11 shows a phase diagram of a GeTe—$Bi_2Te_3$-based material.

FIG. 7 shows results of the repeated rewriting characteristic of the ten types of the phase-change optical recording media manufactured in Example 3. FIG. 7 shows the amount of variation of jitter after performing the rewriting repeatedly $10^5$ times (jitter after the rewriting performed $10^5$ times/initial jitter) for the ten types of the phase-change optical recording media. In FIG. 7, the horizontal axis represents the $N_2$ partial pressure of the sputtering gas during the formation of the upper interface layer 65, and the vertical axis represents the amount of variation of the jitter after performing the rewriting repeatedly $10^5$ times. Only the measuring points corresponding to $N_2$ partial pressure=14 to 65% are plotted on the graph shown in FIG. 7. However, the measurement was unsuccessful for the remaining cases in which the $N_2$ partial pressures were 6, 10, and 78%, because the jitter characteristic was extremely deteriorated.

As clarified from FIG. 7, as the $N_2$ partial pressure becomes smaller, i.e., as the nitrided amount of the upper interface layer becomes smaller, the amount of variation of jitter becomes smaller. When the upper interface layer was formed at an $N_2$ partial pressure in the vicinity of 20%, the amount of variation of jitter was about 1.15. However, as described above, the measurement of the jitter was unsuccessful at $N_2$ partial pressures of 6% and 10%. Therefore, if the $N_2$ partial pressure is too small, the jitter characteristic is deteriorated as well. Taking this point into consideration, it has been revealed from the results shown in FIG. 7 that the $N_2$ partial pressure, which is to be used when the upper interface layer 65 is formed by the sputtering, is most preferably in the vicinity of 20%.

EXAMPLE 4

In Example 4, eleven types of recording layers and three types of lower interface layers were prepared to manufacture a variety of phase-change optical recording media by changing the combination of the recording layer and the lower interface layer. The phase-change optical recording media were manufactured in the same manner as in Example 1 except that the combination of the recording layer and the lower interface layer was changed. FIG. 8 shows the compositions of the eleven types of the recording layers prepared in Example 4 and the contents of Ge in the recording layers (hereinafter referred to as "Ge contents"). The three types of the lower interface layers prepared in Example 4 were Ge—N, $(Ge_{80}Cr_{20})_{50}N_{50}$ (at. %), and $(Ge_{80}Si_{20})_{50}N_{50}$ (at. %).

The repeated rewriting test was also performed for the various phase-change optical recording media manufactured in Example 4 in the same manner as in Example 1. However, the linear velocity during the recording and reproduction of information was a low linear velocity of 8.2 m/s. Obtained results are shown in FIG. 8. In FIG. 8, the phase-change optical recording medium, in which the number of rewritable times exceeds $10^5$, is indicated by "+", the phase-change optical recording medium, in which the number of rewritable times is $10^4$ to $10^5$, is indicated by "±", and the phase-change optical recording medium, in which the number of rewritable times is less than $10^4$, is indicated by "−".

As clarified from FIG. 8, when the lower interface layer was Ge—N, the rewriting was successful exceeding $10^5$ times when the Ge content in the recording layer was 22.2 at. % ($Ge_2Sb_2Te_5$, relative ratio). However, when the Ge content in the recording layer was further increased, the rewriting was unsuccessful exceeding $10^5$ times. Further, when the lower interface layer is Ge—Cr—N, the rewriting was successful exceeding $10^5$ times on condition that the Ge content in the recording layer was 22.2 at. % ($Ge_2Sb_2Te_5$, relative ratio) and 27.3 at. % ($Ge_3Sb_2Te_6$, relative ratio).

However, when the Ge content in the recording layer was further increased, the rewriting was unsuccessful exceeding $10^5$ times. On the contrary, as clarified from FIG. 8, when the lower interface layer is Ge—Si—N, the rewriting was successful exceeding $10^5$ times for all of the phase-change optical recording media manufactured in Example 4. That is, the following fact has been revealed. When Ge—N and Ge—Cr—N are used for the lower interface layer, the rewriting is unsuccessful exceeding $10^5$ times for the phase-change optical recording medium in which the Ge content of the recording layer is not less than 30 at. %. However, when the lower interface layer is formed of Ge—Si—N, the rewriting is successful exceeding $10^5$ times even for the phase-change optical recording medium in which the Ge content of the recording layer is not less than 30 at. %. Therefore, it has been revealed that Ge—Si—N is required to be used for the lower interface layer in order to provide both of the sufficient reproduced signal output and the excellent repeated rewriting characteristic with respect to the phase-change optical recording medium based on the use of the recording layer in which the Ge content is not less than 30 at. %. In particular, in the case of the phase-change optical recording medium based on the use of the Bi—Ge—Te-based alloy in which the Ge content in the recording layer is not less than 46.0 at. %, the number of rewritings was less than $10^4$ for the lower interface layer other than the lower interface layer based on the use of Ge—Si—N.

EXAMPLE 5

In Example 5, Ge—Sb—Sn—Te was used for recording layers to prepare twelve types of the recording layers in which the composition ratios of respective constitutive elements of the recording layers differed. Further, three type of lower interface layers with different constitutive elements were prepared to manufacture various phase-change optical recording media by changing the combination of the recording layer and the lower interface layer. The phase-change optical recording media were manufactured in the same manner as in Example 1 except that the material for forming the recording layer and the combination of the recording layer and the lower interface layer were changed.

FIG. 9 shows the compositions of the twelve recording layers prepared in Example 5 as represented by the atomic ratios and the sums of the Ge contents and the Sn contents in the recording layers. The three lower interface layers prepared in Example 5 were Ge—N, $(Ge_{80}Cr_{20})_{50}N_{50}$ (at. %), and $(Ge_{80}Si_{20})_{50}N_{50}$ (at. %).

The repeated rewriting test was performed in the same manner as in Example 1 for the various phase-change optical recording media manufactured in Example 5. However, the linear velocity during the recording and reproduction of information was a low linear velocity of 8.2 m/s. Obtained results are shown in FIG. 9. In FIG. 9, the phase-change optical recording medium, in which the number of rewritable times exceeds $10^5$, is indicated by "+", the phase-change optical recording medium, in which the number of rewritable times is $10^4$ to $10^5$, is indicated by "±", and the phase-change optical recording medium, in which the number of rewritable times is less than $10^4$, is indicated by "−".

As clarified from FIG. 9, when the lower interface layer is formed of Ge—N and Ge—Cr—N, the rewriting was unsuccessful exceeding $10^5$ times for all of the phase-change optical recording media manufactured in Example 5. On the other hand, when Ge—Si—N was used for the lower interface layer, the rewriting was successful exceeding $10^5$ times for all of the phase-change optical recording media manufactured in Example 5. That is, it has been revealed that Ge—Si—N is required to be used for the lower interface layer in order to provide both of the sufficient reproduced signal output and the excellent repeated rewriting characteristic with respect to the phase-change optical recording medium in which the total content of Ge and Sn in the recording layer is not less than 30 at. %.

EXAMPLE 6

Figure 12:
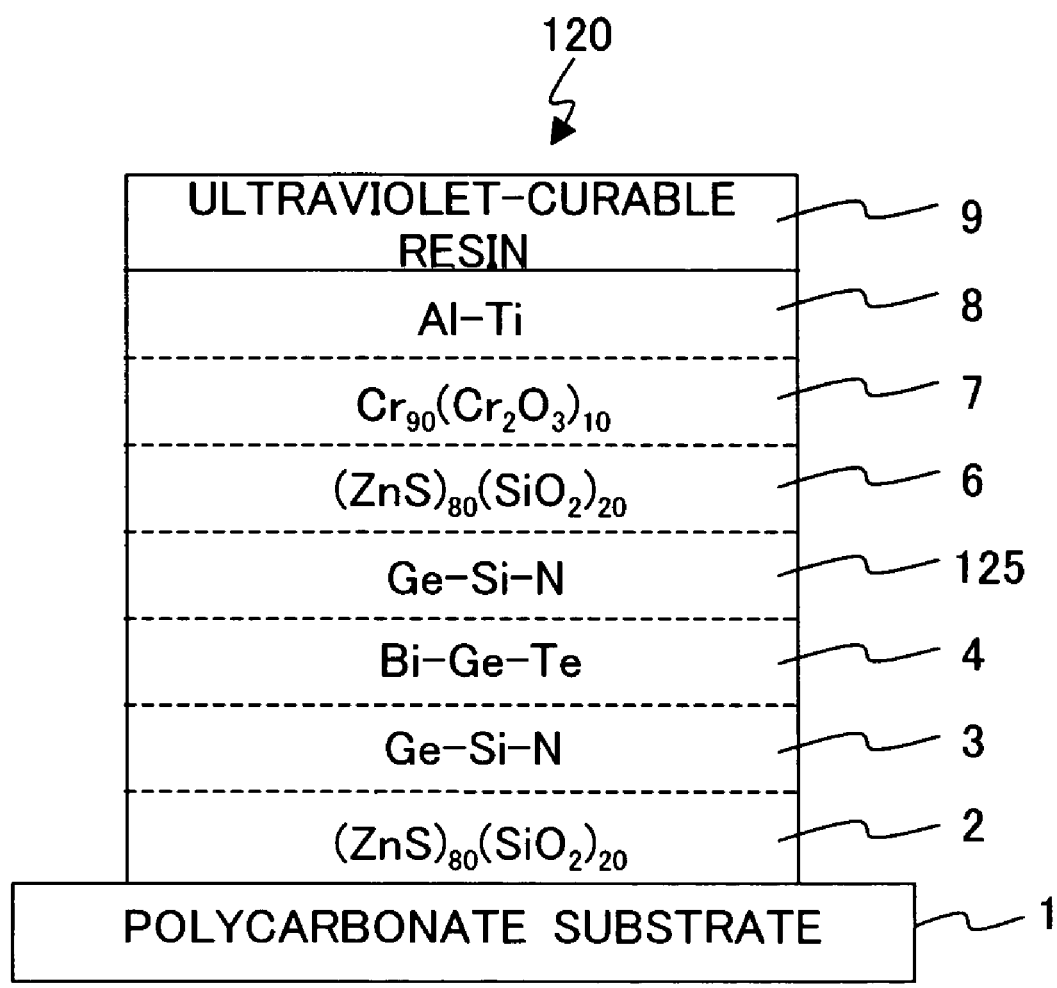
FIG. 12 shows a schematic sectional view illustrating a phase-change optical recording medium manufactured in Example 6.

FIG. 12 shows a schematic sectional view illustrating a phase-change optical recording medium manufactured in Example 6. In Example 6, the phase-change optical recording medium was manufactured in the same manner as in Example 1 except that the constitutive material for an upper interface layer 125 was $(Ge_{60}Si_{40})_{50}N_{50}$ (at. %). The repeated rewriting test was performed in accordance with the same method as that used in Example 1 for the phase-change optical recording medium manufactured in Example 6. As a result, the jitter was not more than 12% at the low linear velocity of 8.2 m/s even when the number of repeated rewritings was $1.5 \times 10^5$. In Example 6, the repeated rewriting characteristic was further improved as compared with the phase-change optical recording medium of Example 1 in which the jitter exceeded 12% when the number of repeated rewritings was $1.2 \times 10^5$. On the other hand, approximately the same results as those obtained in Example 1 were obtained at the high linear velocity of 20.5 m/s. In Example 6, a phase-change optical recording medium, in which the lower interface layer 3 was formed of $(Ge_{60}Si_{40})_{50}N_{50}$ (at. %) similarly to the upper interface layer 125, was also manufactured. The repeated rewriting test was performed in the same manner as in Example 1. As a result, the following fact was revealed. That is, a value of the jitter of not more than 10% was obtained even when the number of repeated rewritings was $1.5 \times 10^5$ at the low linear velocity of 8.2 m/s, and thus the repeated rewriting characteristic was further improved.

In Example 6, a variety of phase-change optical recording media were manufactured, in which the thickness of any one of the interface layers of the upper interface layer 125 and the lower interface layer 3 was fixed to be 5 nm, and the thickness of the other interface layer was changed within a range of 1 nm to 17 nm. The repeated rewriting test was performed in the same manner as in Example 1. However, in the case of the various phase-change optical recording media manufactured in Example 6, the material for forming the lower interface layer 3 was $(Ge_{80}Si_{20})_{50}N_{50}$ (at. %). The reflectance was also investigated for the various phase-change optical recording media manufactured in Example 6. Obtained results are shown in FIG. 13. In FIG. 13, the phase-change optical recording medium, in which the jitter is not more than 10% at the number of rewritings of $10^5$, is indicated by "++", the phase-change optical recording medium, in which the jitter is not more than 12% at the number of rewritings of $10^5$, is indicated by "+", and the phase-change optical recording medium, in which the jitter exceeds 12% at the number of rewritings of $10^5$, is indicated by "−". On the other hand, as for the reflectance, the phase-change optical recording medium, in which the reflectance is not less than 15% at the mirror portion of the phase-change optical recording medium, is indicated by "+", and the phase-change optical recording medium, in which the reflectance is less than 15%, is indicated by "−".

As clarified from FIG. 13, when the thickness was within a range of 1.5 nm to 17 nm for both of the upper interface layer and the lower interface layer, the jitter was not more than 12% at the number of repeated rewritings of $1\times10^5$ times. In particular, the jitter was not more than 10% at the number of repeated rewritings of $1\times10^5$ times within a range of 2 nm to 7 nm, in which especially satisfactory results were obtained. However, the reflectance was less than 15% when the interface layer had the thickness of 17 nm. Therefore, according to the results shown in FIG. 13, the following fact has been revealed. That is, satisfactory results are obtained for both of the repeated rewriting characteristic and the reflectance characteristic when the thicknesses of the upper interface layer and the lower interface layer are within a range of 1.5 nm to 15 nm.

Further, in Example 6, a variety of phase-change optical recording media were manufactured, in which the thicknesses of both of the upper interface layer and the lower interface layer were 3 nm, the nitrogen content of any one of the interface layers of the upper interface layer and the lower interface layer was fixed to 30 at. %, and the nitrogen content of the other interface layer was changed within a range of 10 at. % to 60 at. %. The repeated rewriting test was performed in the same manner as in Example 1. The composition ratio between Ge and Si in the material for forming the lower interface layer 3 was Ge:Si=80:20 as represented by the atomic ratio. The various phase-change optical recording media manufactured in Example 6 were stored in a high temperature and high humidity environment (80° C., 80% RH, 48 hours). After that, recording was performed on non-recorded tracks to investigate the error rate. The so-called shelf characteristic was measured. Obtained results are shown in FIG. 14. In FIG. 14, the phase-change optical recording medium, in which the jitter is not more than 10% at the number of rewritings of $1\times10^5$, is indicated by "++", the phase-change optical recording medium, in which the jitter is not more than 12% at the number of rewritings of $1\times10^5$, is indicated by "+", and the phase-change optical recording medium, in which the jitter exceeds 12% at the number of rewritings of $1\times10^5$, is indicated by "−". The phase-change optical recording medium, in which the error rate is not more than $1\times10^{-4}$, is indicated by "++", the phase-change optical recording medium, in which the error rate is not more than $5\times10^{-4}$, is indicated by "+", and the phase-change optical recording medium, in which the error rate exceeds $5\times10^{-4}$, is indicated by "−".

As clarified from FIG. 14, the following fact has been revealed. That is, the jitter is not more than 12% at the number of repeated rewritings of $1\times10^5$ when the nitrogen content is within a range of 20 at. % to 60 at. % for both of the upper interface layer and the lower interface layer. In particular, when the nitrogen content is within a range of 30 at. % to 60 at. %, then the jitter is not more than 10% at the number of repeated rewritings of $1\times10^5$, and thus more satisfactory results are obtained.

As clarified from FIG. 14, the following fact has been revealed. That is, the error rate, which is obtained after storing the phase-change optical recording medium in the high temperature and high humidity environment (80° C., 80% RH, 48 hours), is not more than $5\times10^{-4}$ by allowing the nitrogen content of the upper interface layer to be within a range of 20 at. % to 50 at. %. In particular, it has been revealed that when the nitrogen content of the upper interface layer is within a range of 20 at. % to 30 at. %, the error rate of not more than $1\times10^{-4}$ is obtained. Further, the following fact has been revealed. That is, the error rate is not more than $5\times10^{-4}$ within a range in which the nitrogen content of the lower interface layer is 20 at. % to 50 at. %. In particular, when the nitrogen content is within a range of 20 at. % to 40 at. %, the error rate of not more than $1\times10^{-4}$ is obtained. Therefore, according to the results shown in FIG. 14, it has been revealed that when the nitrogen contents of the upper interface layer and the lower interface layer are within a range of 20 at. % to 50 at. %, satisfactory results are obtained for both of the characteristics of the repeated rewriting characteristic and the shelf characteristic (error rate). In particular, it has been revealed that when the nitrogen content of the upper interface layer is within a range of 20 at. % to 30 at. %, and the nitrogen content of the lower interface layer is within a range of 20 at. % to 40 at. %, then the repeated rewriting characteristic and the shelf characteristic are further improved.

In Examples 1 to 6 described above, information was recorded and reproduced to make the evaluation at the two linear velocities (high linear velocity (20.5 m/s) and low linear velocity (8.2 m/s)). However, information may be recorded and reproduced at other linear velocities. The same or equivalent effect is also obtained even in the case of the use of phase-change recording media capable of performing the recording at recording linear velocities in a wide range.

In Examples 1 to 6 described above, the shortest mark length of the phase-change optical recording medium was 0.42 μm and the track pitch was 615 nm. However, the present invention is not limited thereto. The track pitch may be further narrowed, and/or the shortest mark length may be further shortened. It is possible to form the phase-change optical recording medium with the shortest mark length and the track pitch each having any arbitrary size.

In Examples 1 to 6 described above, the explanation has been made about the case of the recording performed in the data recording area by way of example. However, the recording may be performed in any area other than the data recording area. In particular, when the present invention is applied, for example, to an alternate or substitute sector in a read-out area, the effect is more conspicuous, because the information rewriting frequency is large as compared with the data recording area.

In Examples 1 to 6 described above, the explanation has been made about the phase-change optical recording medium based on the land-groove recording. However, the present invention is not limited thereto. It is also allowable to use a phase-change optical recording medium based on the land recording or the groove recording.

In Examples 1 to 6 described above, the substrate was used, in which the data recording area was divided into 35 zones in the radial direction of the phase-change optical recording medium. However, the present invention is not limited thereto. The number of zones may be further increased or decreased. The phase-change optical recording medium may be formed with any arbitrary number of zones. It is also allowable that the data recording area is not divided into zones.

In Examples 1 to 6 described above, the 8–16 modulation system was used. However, it is also allowable to use any other modulation system including, for example, RLL (1, 7), RLL (2, 7), and NRZI.

In the information-recording apparatus used in Examples 1 to 6 described above, the semiconductor laser having the wavelength of 655 nm was used. However, the present invention is not limited thereto. The same or equivalent effect as those obtained in Examples 1 to 6 was obtained even in the case of the use of a laser having a longer wavelength, for example, a laser having a wavelength in the vicinity of 780 nm or in the vicinity of 830 nm. The same or equivalent effect as those obtained in Examples 1 to 6 was obtained even in the case of the use of a laser having a shorter wavelength, for example, a laser having a wavelength in the vicinity of 405 nm.

In the information-recording apparatus used in Examples 1 to 6 described above, the lens having the numerical aperture of 0.6 was used. However, it is also allowable to use a lens having a numerical aperture of 0.45 to 0.7. Alternatively, it is also allowable to use an information-recording apparatus having a numerical aperture of not less than 0.7 by combining two or more lenses. In particular, when a lens having a numerical aperture of 0.85 and a laser having a wavelength of 405 nm are used in combination, it is possible to perform the recording at a higher speed and a higher density. Further, the effective numerical aperture may be not less than 1 by making combination, for example, with SIL (Solid Immersion Lens). It is also allowable to perform the near field recording by using, for example, an evanescent light beam based on SIL.

According to the present invention, the interface layer, which contains at least Ge, Si, and N, is formed in contact with the surface on at least one side of the recording layer of the phase-change optical recording medium. Accordingly, the excellent repeated rewriting performance is obtained even with the phase-change optical recording medium having the recording layer based on the use of the phase-change material having the high melting point such as the Bi—Ge—Te-based alloy. Therefore, even in the case of the phase-change optical recording medium capable of recording and reproducing information at a high speed, it is possible to provide the phase-change optical recording medium in which the reproduced signal output is sufficiently large and the repeated rewriting performance is excellent.

What is claimed is:

1. A phase-change optical recording medium for recording and reproducing information by being irradiated with a light beam, the phase-change optical recording medium comprising:
   a recording layer containing Bi, Ge, and Te; and
   an interface layer which contains Ge, Si, and N and which is formed in contact with at least one side of the recording layer,
   wherein an atomic ratio Ge:Si in the interface layer is 90:10 to 40:60.

2. The phase-change optical recording medium according to claim 1, wherein a content of Ge in the recording layer is 30 at. % to 50 at. %.

3. A phase-change optical recording medium for recording and reproducing information by being irradiated with a light beam, the phase-change optical recording medium comprising:
   a recording layer containing Ge, Sb, and Te; and
   an interface layer which contains Ge, Si, and N and which is formed in contact with at least one side of the recording layer,
   wherein an atomic ratio Ge:Si in the interface layer is 90:10 to 40:60.

4. The phase-change optical recording medium according to claim 3, wherein a content of Ge in the recording layer is 30 at. % to 50 at. %.

5. The phase-change optical recording medium according to claim 3, wherein the recording layer further contains Sn, and a total content of Ge and Sn in the recording layer is 30 at. % to 50 at. %.

6. A method for producing the phase-change optical recording medium as defined claim 1, the method comprising forming the interface layer by sputtering, wherein a target, in which an atomic ratio Ge:Si is 90:10 to 40:60, is used for the sputtering to form the interface layer.

7. A phase-change optical recording medium for recording and reproducing information by being irradiated with a light beam, the phase-change optical recording medium comprising:
   a recording layer containing Bi, Ge, and Te; and
   interface layers each of which contains Ge, Si, and N and which are formed in contact with both sides of the recording layer,
   wherein an atomic ratio Ge:Si in the interface layers is 90:10 to 40:60.

8. The phase-change optical recording medium according to claim 1, wherein the interface layer has a thickness of 1.5 nm to 15 nm.

9. A phase-change optical recording medium for recording and reproducing information by being irradiated with a light beam, the phase-change optical recording medium comprising:
   a recording layer containing Bi, Ge, and Te; and
   an interface layer which contains Ge, Si, and N and which is formed in contact with at least one side of the recording layer,
   wherein a content of nitrogen in the interface layer is 20 at. % to 50 at. %.

10. A method for producing the phase-change optical recording medium as defined in claim 3, the method comprising forming the interface layer by sputtering, wherein a target, in which an atomic ratio Ge:Si is 90:10 to 40:60, is used for the sputtering to form the interface layer.

11. The phase-change optical recording medium according to claim 3, wherein the interface layer has a thickness of 1.5 nm to 15 nm.

12. The phase-change optical recording medium according to claim 7, wherein the interface layer has a thickness of 1.5 nm to 15 nm.

13. A phase-change optical recording medium for recording and reproducing information by being irradiated with a light beam, the phase-change optical recording medium comprising:
   a recording layer containing Ge, Sb, and Te; and
   an interface layer which contains Ge, Si, and N and which is formed in contact with at least one side of the recording layer,
   wherein a content of nitrogen in the interface layer is 20 at. % to 50 at. %.

14. A phase-change optical recording medium for recording and reproducing information by being irradiated with a light beam, the phase-change optical recording medium comprising:
   a recording layer containing Bi, Ge, and Te; and
   interface layers each of which contains Ge, Si, and N and which are formed in contact with both sides of the recording layer,
   wherein a content of nitrogen in the interface layer is 20 at. % to 50 at. %.

15. A phase-change optical recording medium for recording and reproducing information by being irradiated with a light beam, the phase-change optical recording medium comprising:
   a recording layer containing Bi, Ge, and Te; and
   an interface layer which contains Ge, Si, and N and which is formed in contact with at least one side of the recording layer,
   wherein a content of Si in the interface layer is 5 at. % to 30 at. %.

16. The phase-change optical recording medium according to claim 15, wherein a content of Si in the interface layer is 10 at. % to 30 at. %.

17. A phase-change optical recording medium for recording and reproducing information by being irradiated with a light beam, the phase-change optical recording medium comprising:
- a recording layer containing Ge, Sb, and Te; and
- an interface layer which contains Ge, Si, and N and which is formed in contact with at least one side of the recording layer,
- wherein a content of Si in the interface layer is 5 at. % to 30 at. %.

18. The phase-change optical recording medium according to claim 17, wherein a content of Si in the interface layer is 10 at. % to 30 at. %.

19. A phase-change optical recording medium for recording and reproducing information by being irradiated with a light beam, the phase-change optical recording medium comprising:
- a recording layer containing Bi, Ge, and Te; and
- interface layers each of which contains Ge, Si, and N and which are formed in contact with both sides of the recording layer,
- wherein a content of Si in the interface layer is 5 at. % to 30 at. %.

20. The phase-change optical recording medium according to claim 19, wherein a content of Si in the interface layer is 10 at. % to 30 at. %.

* * * * *